May 1, 1934.    W. RIEHM    1,957,294
INTERNAL COMBUSTION ENGINE
Filed July 24, 1930
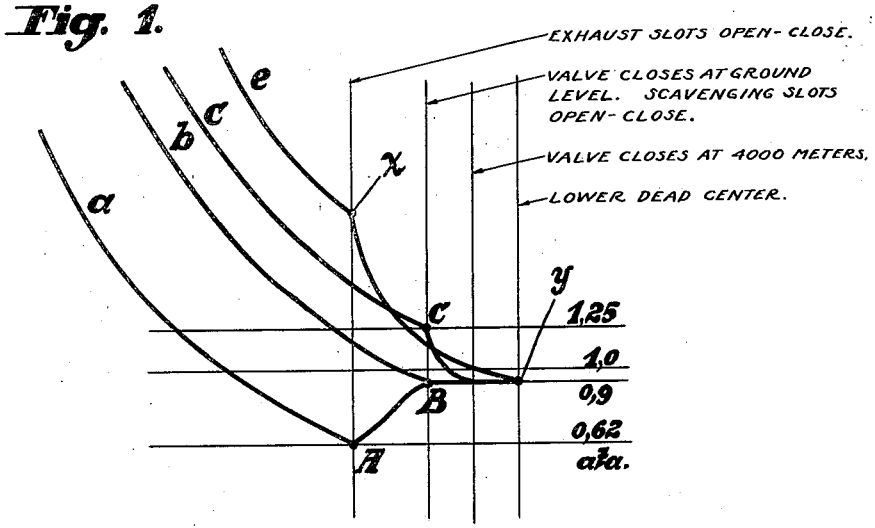
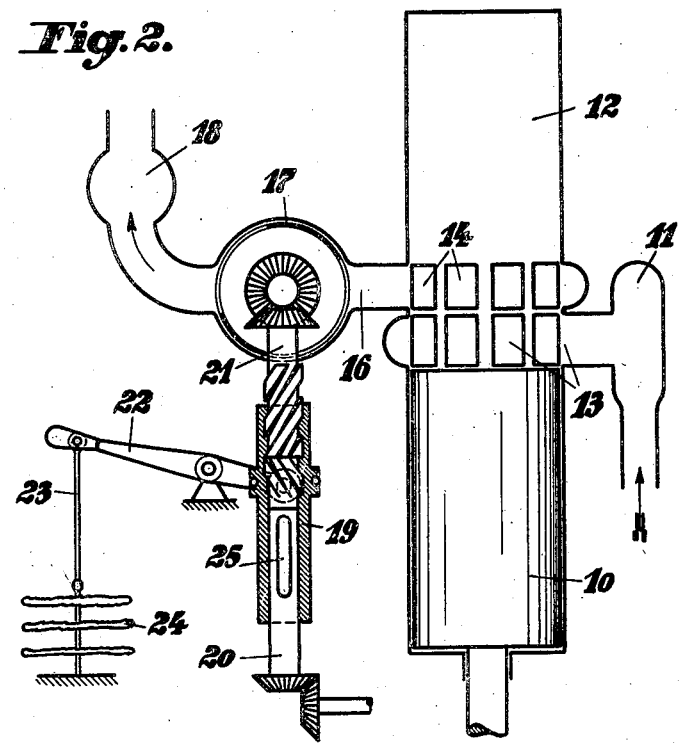
Inventor
Wilhelm Riehm
by Maréchal + Noe
attorneys Patented May 1, 1934

1,957,294

UNITED STATES PATENT OFFICE 1,957,294

INTERNAL COMBUSTION ENGINE

Wilhelm Riehm, Augsburg, Germany, assignor to Maschinenfabrik Augsburg-Nurnberg A. G., Augsburg, Germany, a corporation of Germany Application July 24, 1930, Serial No. 470,271
In Germany August 2, 1929

3 Claims. (Cl. 123—76)

This invention relates to aircraft engines and more particularly to aircraft engines operating with scavenging air.

The principal object of the invention is the provision of an aircraft engine provided with a valve in the engine exhaust line which is governed to maintain the pressure of the air charged in the cylinder substantially constant at varying heights above the ground.

Other objects and advantages of the invention will be apparent from the following description, the appended claims, and the accompanying drawing, in which, Fig. 1 is a diagrammatic view of the pressure conditions that obtain in an engine embodying the present invention, and Fig. 2 is a view, shown part diagrammatically, of an engine embodying the present invention.

The present invention deals with two-stroke-cycle aircraft motors having port scavenging and a scavenging-air pump supplying the same weight of air at all flying heights, as also a closing device in the exhaust pipe controlled by the crank shaft, and solves the problem of keeping the pressure of the charging air constant at all altitudes by causing the throttling device to close the exhaust ports in dependence on the flying height, that is to say, later at low heights and earlier at greater heights.

Referring now to Fig. 2, 12 designates an aircraft engine cylinder, preferably of the two-cycle double acting Diesel type. Scavenging air is supplied to the cylinder from the scavenging air reservoir 11 through the scavenging air slots 13 in the cylinder walls, and this air may flow out through the exhaust slots 14 to the exhaust passage 16. In the exhaust passage is a controllable valve 17, being shown of the rotary type having portions adapted to register with the exhaust pipe so as to interrupt the flow of exhaust gases from the cylinder. This valve is operated from the engine shaft which is operably connected as by means of bevel gears or the like to a rotatable shaft 20, slidably keyed to a sleeve 19 which is operably connected to a shaft 21 which in turn is geared to the valve 17. The valve 17 may therefore be rotated in timed relation with the engine shaft to provide for the flow of exhaust gas and to periodically interrupt the exhaust flow during each cycle, as desired.

The sleeve 19 is longitudinally movably supported on the shaft 20, a key 25 connecting these two parts for simultaneous rotation. Interior threads are provided at one end of the sleeve which engage exterior threads on the shaft 21 which is connected to the rotary valve 17. The sleeve 19 may be moved endwise, its position being controlled either manually or automatically by a lever 22 one end of which engages a thrust collar or groove in the rotatable sleeve 19. Endwise movement of the sleeve 19 causes the telescopic extension or retraction of the shaft 21 with relation to the sleeve and causes a variation of the angular relationship of the two shafts 20 and 21. This causes the valve 17 to close the exhaust passage 16 either sooner or later in the cycle of operations of the engine depending upon the direction in which lever 22 is moved. While the rotary shaft arrangement just described constitutes one preferred form of drive for the cut-off valve, it will be apparent that other differential drives of similar character may be used. The valve 17 may thus be controlled so that the greater the altitude of the aircraft, the earlier in the cycle the exhaust would be closed.

The control lever 22 may be operated manually, or it may be suitably connected to a barometer 24 through a connection stem 23 so that the lever is positioned automatically in accordance with the altitude for regulating the valve 17 in the exhaust line to maintain a substantially constant full loading of air in the cylinders regardless of the altitude at which the aircraft is flying.

The effect of this apparatus can be appreciated by reference to the working diagram appearing in Figure 1, where it is assumed that the operation takes place at a height of about 4000 metres, corresponding to an air pressure of 0.62 atm. The expansion line $e$ is interrupted at the point X by the opening of the exhaust ports whereupon the pressure in the cylinder, until the opening of the scavenging ports, falls below the scavenging pressure, which amounts at all altitudes to about 1.25 atm. On the opening of the scavenging ports the scavenging process begins and, after reversal of the piston, at the point Y, terminates at the point B. During the scavenging, there is in the cylinder a pressure of 0.9 atm. which corresponds to about the mean between the scavenging pressure (1.25 atm.) and the exhaust pressure (0.62 atm.). Simultaneously with the closing of the scavenging ports, at the point B, the cut-off device in the exhaust pipe closes, so that a further fall of the scavenging-air pressure, as would take place if the cut-off member were not present according to the line B—A, is prevented. The compression begins at the point B and follows the line $b$.

There are now the following conditions to be taken into consideration at the assumed altitude:

During the exhaust periods, the exhaust ports, which, like the scavenging ports, are designed for ground conditions, in consequence of the low exhaust back pressure, prove too large, and the exhaust process consequently occupies a shorter time, in view of the greater differences of pressure available, than on the ground. The same applies to the scavenging process, where also, with a constant scavenging pressure of about 1.25 atm., the excess pressure, as compared with that of the atmosphere, has become greater. If now the point at which the exhaust cut-off device closes the exhaust remains unaltered, the consequence is that, during the opening of the scavenging-air ports, a much larger quantity of scavenging air passes through than is actually necessary for good scavenging. This excessive use of scavenging air is consequently wasteful and results in increased working loss for its supply.

According to the invention, the exhaust valve is operated through a device which permits the point of time at which the cut-off device closes the exhaust pipe to be regulated in dependence on the altitude of the motor. Thus, the following effect is attained:

At greater altitudes the actual scavenging process is, as above shown, finished before the piston closes the scavenging-air ports. The exhaust cut-off device is consequently adjusted to correspond with such earlier closing so that no scavenging air can escape unused. At the same time a certain further charging of the cylinder takes place, since, with the scavenging ports still open but with the exhaust already closed, scavenging air flows on and fills the cylinder to the amount of the scavenging-air pressure itself; thus while reducing the air consumption, a further charging effect is obtained. The force of the pressure with such an adjustment of the exhaust cut-off device is also shown in Figure 1. The cut-off device closes earlier than the scavenging ports themselves are closed by the piston. After the closing of the exhaust, the pressure, in consequence of the scavenging air still flowing, begins to increase and attains, on the closing of the scavenging ports by the piston at the point c, about the value of the scavenging-air pressure. There is consequently a greater weight of air in the cylinder than with a constant cut-off point of the valve.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. An aircraft engine of the two-cycle Diesel type comprising an engine cylinder having a scavenging air inlet port and an exhaust port adapted to be closed by the piston, means for supplying scavenging air under pressure to the said inlet port, an exhaust passage leading from said exhaust port, a controllable valve in said passage for maintaining the charging pressure at higher altitudes, and valve operating mechanism operable automatically in accordance with the variations in external air pressure comprising control means movable automatically in response to variations in air pressure, and mechanism operated thereby to automatically control the timing of said valve so as to maintain the cylinder charge at the beginning of the compression stroke substantially the same regardless of the external air pressure.

2. An aircraft engine of the two-cycle Diesel type comprising an engine cylinder having a scavenging air inlet port and an exhaust port adapted to be closed by the piston, means for supplying scavenging air under pressure to the said inlet port, an exhaust passage leading from said exhaust port, a controllable valve in said passage for maintaining the charging pressure at higher altitudes, valve operating mechanism, automatic control means movable automatically in response to variations in air pressure, mechanism operably connecting said automatic control means to said valve operating mechanism to automatically control the timing of said valve so as to maintain the cylinder charge at the beginning of the compression stroke substantially the same regardless of the outside air pressure, said valve mechanism including an engine driven shaft portion, an operated shaft portion aligned therewith, a sleeve longitudinally movable on one of said shaft portions and in threaded engagement with the other, and a connection from said sleeve to said automatic control means.

3. The method in the operation of a Diesel engine required to operated under conditions of substantial variation in atmospheric pressure, which comprises supplying scavenging air to the engine under substantially constant pressure regardless of the atmospheric pressure, cutting off the exhaust of scavenging air from said engine during the supplying of scavenging air thereto to leave predetermined amounts of air in the engine to serve as combustion air, and varying the time in the cycle at which said cut-off takes place in accordance with variations in atmospheric pressure so that the cutting off will take place earlier at low atmospheric pressure to thereby obtain a substantially constant air charge.

WILHELM RIEHM.